July 6, 1943.　　　R. W. GEORGE　　　2,323,762
MEASUREMENT AND RECORDING OF TRANSIENT PEAK VOLTAGES
Filed Jan. 31, 1940
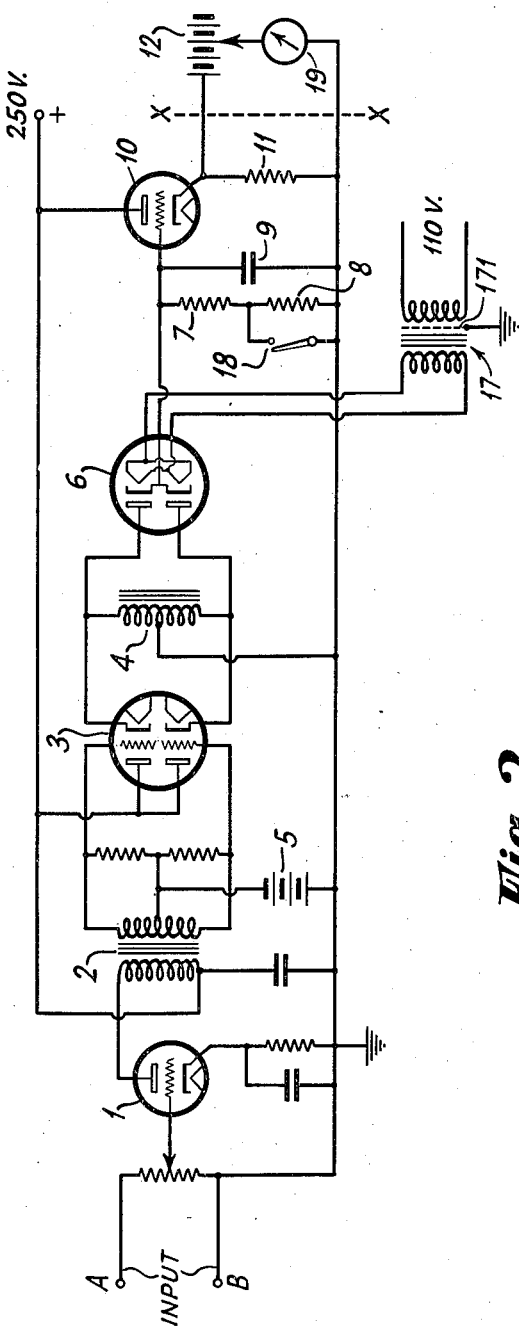
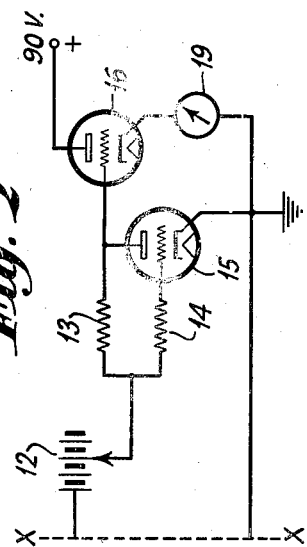
INVENTOR.
RALPH W. GEORGE
BY
ATTORNEY.

Patented July 6, 1943

2,323,762

UNITED STATES PATENT OFFICE 2,323,762

MEASUREMENT AND RECORDING OF TRANSIENT PEAK VOLTAGES

Ralph W. George, Riverhead, N. Y., assignor to Radio Corporation of America, a corporation of Delaware Application January 31, 1940, Serial No. 316,611

12 Claims. (Cl. 171—95)

The present invention relates to a method of and a means for measuring and recording transient peak voltages in electrical circuits.

As far as I am aware, the present means for indicating and/or recording the absolute peak values of intermittent or transient voltages are limited to the use of cathode ray tubes for practical purposes when the greatest accuracy is required. However, the use of cathode ray tubes for direct observation or for recording of the results in order to obtain a permanent record is not without disadvantages due to the necessity of operating the cathode ray tube in reduced room illumination and also due to the difficulty of obtaining sufficient brilliancy of the cathode ray image at high speeds in order to make a clear photographic record. Furthermore, photographic recording is somewhat complex for continuous usage under conditions usually encountered. Heretofore known circuits for measurement to give meter indications, to record and which may include compression means to give a greater range than is had with linear circuits are objectionable in that the circuits utilized do not have sufficient power handling ability to operate a positive recording structure. On the other hand, if the circuit is designed to handle sufficient power for direct recording the circuit is insensitive to very short duration impulses. In this connection it should be understood that electrical noises or transients are properly measured with reference to the frequency band width of the circuits used to measure them when these circuits do not accept all the frequencies present in their original noise impulse. In the case of ignition noise or occasional clicks from circuit controlling equipment, the radio frequency noise is apparent in the output of a receiver. If the low frequency output circuits limit the band width to a known value less than half the radio frequency band width of the receiver, the amplitude of the output noise can be measured with reference to the known band width. If this band width is reduced by the insertion of a band pass filter, the amplitude of the output noise decreases but the time duration of the noise increases. Thus a sharp impulse having a peak value of 10 units in a 10 kilocycle band width is changed to an impulse having a peak value of 1 unit lasting ten times as long when the band width is reduced to 1 kilocycle.

In view of the above briefly stated considerations it should be seen that the design of recording equipment for wide-band measurements is comparatively difficult because of the relatively short duration of the noise pulses. This difficulty occurs because of the slow action of available meters or recorders and because heretofore available electrical circuits designed to hold a voltage level long enough to permit a meter to act cannot build up to the proper power level in the short time available.

An object, therefore, of the present invention is the provision of a circuit for measuring peak values of very short intermittent voltage impulses.

Another object is the provision of a measuring circuit, as aforesaid, adapted to actuate a recording meter.

Still another object of the present invention is the provision of a measuring circuit, as aforesaid, which presents these indications in a more readily useable form than has heretofore been available.

A further object is the provision of a measuring circuit, as aforesaid, which is useable over a wide range of amplitudes.

Still a further object of the present invention is the provision of a measuring circuit, as aforesaid, which is useable over a wide frequency band.

The present invention features a driving amplifier for the peak voltage storage means, said amplifier including inverse feedback whereby its resistance is reduced to a value which will permit extremely fast storage in the storage means, and means for measuring the stored voltage, said measuring means being characterized by extremely high input resistance. The measuring means is further characterized by good output regulation whereby said measuring means is capable of positively operating indicating means requiring substantial driving power.

A further feature of the invention is the provision of a circuit for causing the measuring means to give an indication proportional to the logarithm of the voltage applied to the circuit.

Further objects and features of the present invention will be apparent from the following detailed description which is accompanied by a drawing in which Figure 1 illustrates a circuit diagram of one embodiment of the invention, while Figure 2 illustrates a modification of the portion of Figure 1 to the right of dotted lines X, X.

Referring, now, to Figure 1, tube 1 is a conventional triode thermionic discharge tube having a pair of input terminals A, B to which the voltage to be measured is connected. The output of amplifier tube 1 is connected by means of stepup transformer 2 to the push-pull grids of thermionic amplifier tube 3. Tube 3 operates at normal plate current with a normal bias from grid biasing battery 5. The maximum peak grid to ground voltage on amplifier 3 may be of the order of 125 volts without overloading amplifier 3. The output of amplifier 3 is taken across reactor 4 connected between the cathodes of tube 3 to the anodes of the full wave rectifier 6. The voltage delivered to rectifier 6 is nearly equal to $$\frac{\mu}{\mu+1}$$

times the grid voltage of 3 where $\mu$ is the amplification factor of tube 3. The advantage gained by this 100 percent feedback in amplifier stage 3 is that the resistance of the driver is greatly reduced. The resistance may be reduced to a value of the order of 350 ohms. The output of full wave rectifier 6 is arranged to charge small condenser 9. The resistances 7 and 8 connected in series across condenser 9 control the rate of discharge of condenser 9. The discharge rate is conveniently adjustable by means of switch 18 which is arranged to short circuit resistor 8 thus increasing the discharge rate when desired. High potential side of condenser 9 is charged positive with respect to ground. The voltage due to the charge on condenser 9 is applied to the grid of the direct current amplifier 10. The grid of this tube presents no load to condenser 9 because of the high bias on the tube cathode due to the high resistance of cathode resistor 11. The output of tube 10 is taken across cathode resistor 11 and is likewise positive and also nearly equal to $$\frac{\mu}{\mu+1}$$

times the grid voltage of 10 due to the high inverse feedback. Tube 10 therefore acts as a relay having extremely high input resistance and capable of supplying to the output several milliamperes at substantially the input voltage.

In order to charge the condenser 9 in a very short time it must be small. The charging source is designed to have good regulation for the same reason. In this connection it should be noted that the direct current resistance of reactor 4 must be kept as small as possible since it is in series with the charging circuit for condenser 9.

The voltage across condenser 9 is utilized by means of the high impedance amplifier 10 which, also, has good regulation in its output making it possible to drive a variety of indicating devices.

The charge on condenser 9 must be held at nearly its maximum value for a finite length of time such as half a second or more thus permitting indicating instruments or recorders, even if fairly slow-acting, to indicate very nearly the maximum peak voltages obtained on condenser 9. The rate of discharge of condenser 9 is controlled by means of a choice of suitable values of resistor 7, 8 and also by changing the value of condenser 9. Since, as pointed out above, the capacity of condenser 9 must be small in order to charge it quickly, the discharge path through resistors 7, 8 is of the order of several hundred or several thousand megohms. Therefore, circuits associated with cathode of rectifier 6 must have still higher leakage resistance to ground. Since it will be found that the hot resistance between cathode and heater of rectifier 6 is rather low it is necessary that the isolation of the heater circuit for tube 6 from ground be very good.

This may be accomplished by the use of a separate filament battery or an unusually well insulated filament transformer 17. It will be obvious that the capacitance of the filament circuit to ground must be kept low so as not to disturb the function of condenser 9. Another point not so apparent is that the filament supply circuits must not be coupled to external voltages by even so much as a micro-microfarad because of the high impedance from the rectifier cathode to ground. Very good shielding between the primary and secondary of transformer 17 is therefore employed and it is indicated diagrammatically by a separate shield 171. The cathode heater connections of the remaining tubes shown in the circuit have not been separately shown since they are purely conventional.

An important feature of the present invention is that the output of direct current amplifier 10 corresponds with the highest peak value of the input wave applied to terminals A, B regardless of the polarity of the input. This necessarily follows from the use of push-pull amplifier 3 and full wave rectifier 6. A modification of my invention which works equally well, however, for waves having equal positive and negative peaks, or where a measurement of only a single polarity of peak voltages is desired may be constructed utilizing only one triode section of amplifier 3 and a single half wave rectifier 6.

Amplifier 3 operates substantially as a Class A amplifier subject to some qualifications. A sharp surge in input voltage finds the condenser 9 a rather low impedance because during the first few microseconds the charging current is very large. Thus, for a short time, the load impedance of the driver amplifier 3 is low with the result that the amplifier may be temporarily overloaded. However, this difficulty may be satisfactorily overcome by taking care that the driver amplifier 3 has a large power handling ability and low internal impedance. Furthermore, the anode power supply for this tube must have good regulation. Since, as just pointed out, the performance of the circuit is dependent to some extent upon the power handling ability and upon a low internal resistance of the driver amplifier and the rectifier, if desired, a number of tubes may be connected in parallel in each stage instead of a single tube as shown. The power handling requirements of the amplifier may be eased by increasing the length of time of duration of the voltage pulse as much as possible by using as narrow pass-band filters as the conditions allow. This insures that the build up time of the pulse will be longer and its maximum value will be available for a longer time. This also insures that the condenser 9 will be more nearly charged to the peak value of the input voltage.

It is to be understood that the input A, B of the circuit shown in Figure 1 is connected to the output of any desired band-pass filters and amplitude adjustment means. The direct current output of tube 10 may be utilized in a suitable resistive load, preferably of higher resistance than the plate resistance of tube 10.

In Figure 1, I have shown one means of utilizing the output where a linear relation between the input and output is desired. This comprises a high resistance direct current voltmeter or recording voltmeter 19 in series with a biasing battery 12. The adjustable biasing battery 12 is desirable in order to buck out the normal no-signal output voltage.

In Figure 2 I have shown an output arrangement which is designed to be substituted for the portion of Figure 1 to the right of dotted line X, X. This circuit involves an arrangement which may be adjusted to give a nearly logarithmic $$\frac{\text{Input}}{\text{Output}}$$

characteristic. The positive voltage from the upper end of resistor 11 is applied to both the grid and anode of tube 15 through resistors 13 and 14. Tube 15 is preferably of the remote cutoff or variable-mu type. Since triodes of this type are scarce, a satisfactory substitute may be had by using a remote cutoff pentode with the plate and screen connected together and the suppressor connected to the cathode. The grid, drawing grid current through resistance 14 does not obtain a positive voltage proportional to the input. The anode resistance of tube 15 decreases, drawing more plate current as the grid voltage increases due to resistor 13. The anode voltage may, by proper choice of the type of tube 15, and of the values of resistors 13 and 14, be made to increase in a substantially logarithmic manner with increasing input voltage. Tube 16 is connected to the output of tube 15 purely as a direct current amplifier to drive the recording or indicating meter 19. If the power handling capabilities of tube 15 are sufficient it will be unnecessary to include tube 16, and meter 19 may then be connected in the anode circuit of tube 15. The adjustable biasing battery 12 is especially important in this modification for adjusting the operating point of the logarithmic converter tube 15.

No automatic gain control has been used in the present invention since previous circuits, of which I am aware, using automatic gain control with voltage obtained from the time circuit, for example, condenser 9 and resistors 7 and 8 have a serious fault in that the condenser in the time circuit may be greatly overcharged with an abrupt increase in signal level because of the unavoidable time delay before the gain is reduced to the proper value.

A working model of the circuit described with reference to Figure 1 has been found to indicate peak values of rare ignition clicks with less than one db. error for an audio band width of 5 kilocycles. The error was only slightly larger for an audio band width of 15 kilocycles.

While I have particularly shown and described several modifications of my invention, it is to be particularly understood that my invention is not limited thereto but that modifications may be made within the scope of my invention.

I claim:
1. In combination, a push-pull amplifier including a pair of thermionic discharge tubes, each having an anode, a grid and a cathode, circuits connecting each of said anode, grid and cathode to a point of zero reference potential, an input circuit coupled to said grids and said point of reference potential, an output choke in the cathode circuit of said tubes, means for rectifying impulses appearing across said choke, means for storing said rectified impulses and means for measuring the charge due to said stored impulses, said last means being characterized by an extremely high input resistance whereby peak values of said charge are unaffected.

2. In combination, an amplifier including at least one thermionic discharge tube having grid-cathode and anode-cathode circuits connected thereto, said circuits having at least a portion thereof in common, an input circuit coupled to said grid-cathode circuit, an output choke in said common circuit portion, means for rectifying impulses appearing across said choke, means for storing said rectified impulses, another thermionic discharge tube having grid-cathode and anode-cathode circuits connected thereto, said circuits having at least a portion thereof in common, said grid-cathode circuit being connected to said storage means, an output circuit connected across the common portion of said circuits and measuring means connected to said output circuit.

3. In combination, a push-pull amplifier including at least a pair of thermionic discharge tubes, each having grid-cathode and anode-cathode circuits connected thereto, said circuits having at least a portion thereof in common, an input circuit coupled to said grids, a center tapped choke in said common circuit portion, a full wave rectifier connected across said choke, means for storing said rectified impulses, another thermionic discharge tube having grid-cathode and anode-cathode circuits connected thereto at least a portion of said circuits being in common, said grid-cathode circuit being connected to said storage means, an output circuit connected across the common portion of said circuits and measuring means connected to said output circuit.

4. In combination, an amplifier including at least one thermionic discharge tube having grid-cathode and anode-cathode circuits connected thereto, said circuits having at least a portion thereof in common, an input circuit coupled to said grid-cathode circuit, an output choke in said common circuit portion, means for rectifying impulses appearing across said choke, means for storing said rectified impulses, another thermionic discharge tube having grid-cathode and anode-cathode circuits connected thereto, said circuits having at least a portion thereof in common, said grid-cathode circuit being connected to said storage means, an output circuit connected across the common portion of said circuits and measuring means and an adjustable source of potential serially connected across said output circuit.

5. In combination, an amplifier including at least one thermionic discharge tube having grid-cathode and anode-cathode circuits connected thereto, said circuits having at least a portion thereof in common, an input circuit coupled to said grid-cathode circuit, an output choke in said common circuit portion, means for rectifying impulses appearing across said choke, means for storing said rectified impulses, another thermionic discharge tube having grid-cathode and anode-cathode circuits connected thereto, said circuits having at least a portion thereof in common, said grid-cathode circuit being connected to said storage means, an output circuit connected across the common portion of said circuits, a third thermionic discharge tube likewise having grid-cathode and anode-cathode circuits connected thereto, the grid-cathode circuit of said third tube and an adjustable source of potential being connected across said output circuit, a fourth thermionic discharge tube having a grid, a cathode and an anode, said last grid being connected to the anode circuit of said third tube, said fourth tube having a measuring instrument connected in its anode circuit and a resistance connecting the anode of said third tube to said adjustable source of potential whereby said measuring instrument is caused to deflect in logarithmic proportion to the potential across said output circuit.

6. In combination, an amplifier including at least one thermionic discharge tube having grid-cathode and anode-cathode circuits connected thereto, said circuits having at least a portion thereof in common, an input circuit coupled to said grid-cathode circuit, an output choke in said common circuit portion, means for rectifying impulses appearing across said choke, means for storing said rectified impulses, another thermionic discharge tube having grid-cathode and anode-cathode circuits connected thereto, said circuits having at least a portion thereof in common, said storage means forming a part of said grid-cathode circuit, an output circuit connected across the common portion of said circuits, a third and a fourth thermionic discharge tube, each having a grid, a cathode and an anode, a pair of resistances serially connected between the anode and grid of said third tube, a connection from between said resistances to one side of a source of potential, the other side being connected to said output circuit, the grid of said fourth tube being connected to the anode of said third tube, a connection from the anode of said fourth tube to a source of anode potential, the cathode of said third and fourth tubes being connected to ground, that of said fourth tube through a measuring circuit.

7. A logarithmic instrument circuit comprising an input circuit, a pair of thermionic discharge tubes, each having an anode, a cathode and a grid, a pair of resistances connected in series between the grid and anode of the first of said tubes, the connection between said pair of resistances being connected to one side of said input circuit through a variable source of potential, the cathode of said first tube being connected to the other side of said input circuit, a connection from the grid of the second of said tubes to the anode of the first of said tubes, a connection to the anode of the second of said tubes for a source of anode potential and a measuring instrument connected between the cathode of said second tube and said other side of said input circuit.

8. A logarithmic instrument circuit comprising an input circuit, a thermionic discharge tube having an anode, cathode and a grid, a pair of resistances connected in series between the grid and anode of said tube, the connection between said pair of resistances connected to one side of said input circuit, the cathode of said tube being connected to the other side of said input circuit, an anode-cathode circuit for said tube including a source of potential, and means for indicating the potential of said anode with respect to said cathode.

9. A logarithmic instrument circuit comprising an input circuit, a thermionic discharge tube having an anode, a cathode and a grid, a pair of resistances connected in series between the grid and anode of said tube, the junction between said pair of resistances connected to one side of said input circuit, the cathode of said tube being connected to the other side of said input circuit, means for applying an adjustable biasing potential to the grid of said tube with respect to said cathode, an anode-cathode circuit for said tube including a source of potential, and means for indicating the potential of said anode with respect to said cathode.

10. In combination, an input circuit, a push-pull amplifier connected thereto, said push-pull amplifier having a low internal impedance, a low resistance output circuit for said amplifier, a condenser, full wave rectifying means connected in series between each end of said output circuit and said condenser and utilization means responsive to a charge stored in said condenser.

11. In combination, an amplifier including at least one thermionic discharge tube having an anode, a grid and a cathode, circuits connecting said anode, grid and cathode to a point of zero reference potential, said tube having low internal anode-cathode impedance, an input circuit coupled to said grid circuit, a low resistance output impedance in said cathode circuit, a condenser, a circuit for charging said condenser including a series connected rectifier connected between said output impedance and said condenser, said circuit having a low resistance whereby said condenser is rapidly charged, and utilization means responsive to a charge on said condenser, said utilization means having a high resistance whereby the charge on said condenser is slowly dissipated.

12. In combination, an amplifier including a pair of thermionic discharge tubes, each of said tubes having an anode, a grid and a cathode, circuits connecting each of said anodes, grids and cathodes to a point of zero reference potential in a push-pull circuit, said discharge tubes having a low internal anode-cathode impedance, an input circuit coupled to said grids, a low resistance choke connected in the cathode circuit of said tubes, a condenser, a circuit for charging said condenser including series connected rectifiers between each end of said choke and said condenser, said circuit having a low resistance whereby said condenser is rapidly charged, and utilization means responsive to the charge on said condenser, said utilization means having a high resistance whereby the charge on said condenser is slowly dissipated.

RALPH W. GEORGE.